United States Patent
Park et al.

(10) Patent No.: US 9,915,841 B2
(45) Date of Patent: Mar. 13, 2018

(54) CURVED DISPLAY DEVICE

(71) Applicant: Samsung Display Co., Ltd., Yongin (KR)

(72) Inventors: Minwook Park, Asan-si (KR); Jeongman Son, Suwon-si (KR); JinYoung Lee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 43 days.

(21) Appl. No.: 14/793,218

(22) Filed: Jul. 7, 2015

(65) Prior Publication Data
US 2016/0026028 A1    Jan. 28, 2016

(30) Foreign Application Priority Data

Jul. 25, 2014  (KR) .................. 10-2014-0094481

(51) Int. Cl.
| | | |
|---|---|---|
| *G02F 1/1333* | (2006.01) | |
| *G02F 1/1343* | (2006.01) | |
| *G02F 1/1337* | (2006.01) | |

(52) U.S. Cl.
CPC .. *G02F 1/134336* (2013.01); *G02F 1/133707* (2013.01); *G02F 2001/134318* (2013.01)

(58) Field of Classification Search
None
See application file for complete search history.

(56) References Cited

U.S. PATENT DOCUMENTS

| | | | |
|---|---|---|---|
| 7,956,942 B2* | 6/2011 | Lee ................... | G02F 1/136213 349/38 |
| 8,253,882 B2 | 8/2012 | Kibuchi | |
| 2010/0073593 A1 | 3/2010 | Sasaki et al. | |
| 2011/0095974 A1 | 4/2011 | Moriwaki | |
| 2012/0242941 A1* | 9/2012 | Suwa ................ | G02F 1/133707 349/123 |
| 2014/0176856 A1* | 6/2014 | Lee ................... | G02F 1/133305 349/61 |
| 2015/0116621 A1 | 4/2015 | Park et al. | |

FOREIGN PATENT DOCUMENTS

| | | |
|---|---|---|
| JP | 2008-134537 | 6/2008 |
| JP | 2010-072502 | 4/2010 |
| JP | 2011-187345 | 9/2011 |
| JP | 5070340 | 11/2012 |
| KR | 10-2015-0016014 | 2/2015 |

* cited by examiner

*Primary Examiner* — Richard Kim
(74) *Attorney, Agent, or Firm* — H.C. Park & Associates, PLC (57) ABSTRACT

A curved display device includes a display panel and members to curve the display panel in a first direction. The display panel includes a display substrate and a counter substrate. The display substrate comprises a pixel electrode disposed on a display area and in which first slits are formed, and the counter substrate comprises a common electrode facing the pixel electrode and in which second slits are formed. A first side area, a central area and a second side area are sequentially located in the first direction on the display area. When the display panel has a flat shape, a portion of the common electrode positioned between two adjacent second slits among the second slits overlaps the pixel electrode by an overlapping width. The length of the overlapping width in each of the first and second side areas is different from that of the overlapping width in the central area.

18 Claims, 11 Drawing Sheets

CURVED DISPLAY DEVICE

CROSS-REFERENCE TO RELATED APPLICATION

This U.S. non-provisional patent application claims priority from and the benefit of Korean Patent Application No. 10-2014-0094481, filed on Jul. 25, 2014, which is hereby incorporated by reference for all purposes as if fully set forth herein.

BACKGROUND

Field

Exemplary embodiments relate to a curved display panel and a curved display device including the same.

Discussion of the Background

Curved display devices having a curved appearance and providing a curved display area have been recently developed. These curved display devices may provide an image with improved three-dimensional effects, immersion and realism to users.

A curved display device may include a display panel and members coupled to the display panel. When the curved display device is applied to a display device, such as a large-sized television, the display panel has a flat shape prior to being coupled to the members. Also, after the display panel is coupled to the members, the curved shape of the display panel is maintained by the members, and thus the display panel of the curved display device may be given a curved shape.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a curved display device with improved display quality.

Additional aspects will be set forth in the detailed description which follows, and, in part, will be apparent from the disclosure, or may be learned by practice of the inventive concept.

According to exemplary embodiments, curved display devices include a display panel and members coupled to the display panel to curve the display panel in a first direction. The display panel has a display area and comprises a display substrate and a counter substrate coupled to the display substrate. The display substrate comprises a pixel electrode disposed on the display area and in which a plurality of first slits are formed, and the counter substrate comprises a common electrode facing the pixel electrode and in which a plurality of second slits are formed.

A first side area, a central area and a second side area are sequentially located in the first direction on the display area. When the display panel has a flat shape, a portion of the common electrode positioned between two adjacent second slits among the plurality of second slits overlaps the pixel electrode by an overlapping width. The length of the overlapping width in each of the first and second side areas is different from the length of the overlapping width in the central area.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1A:
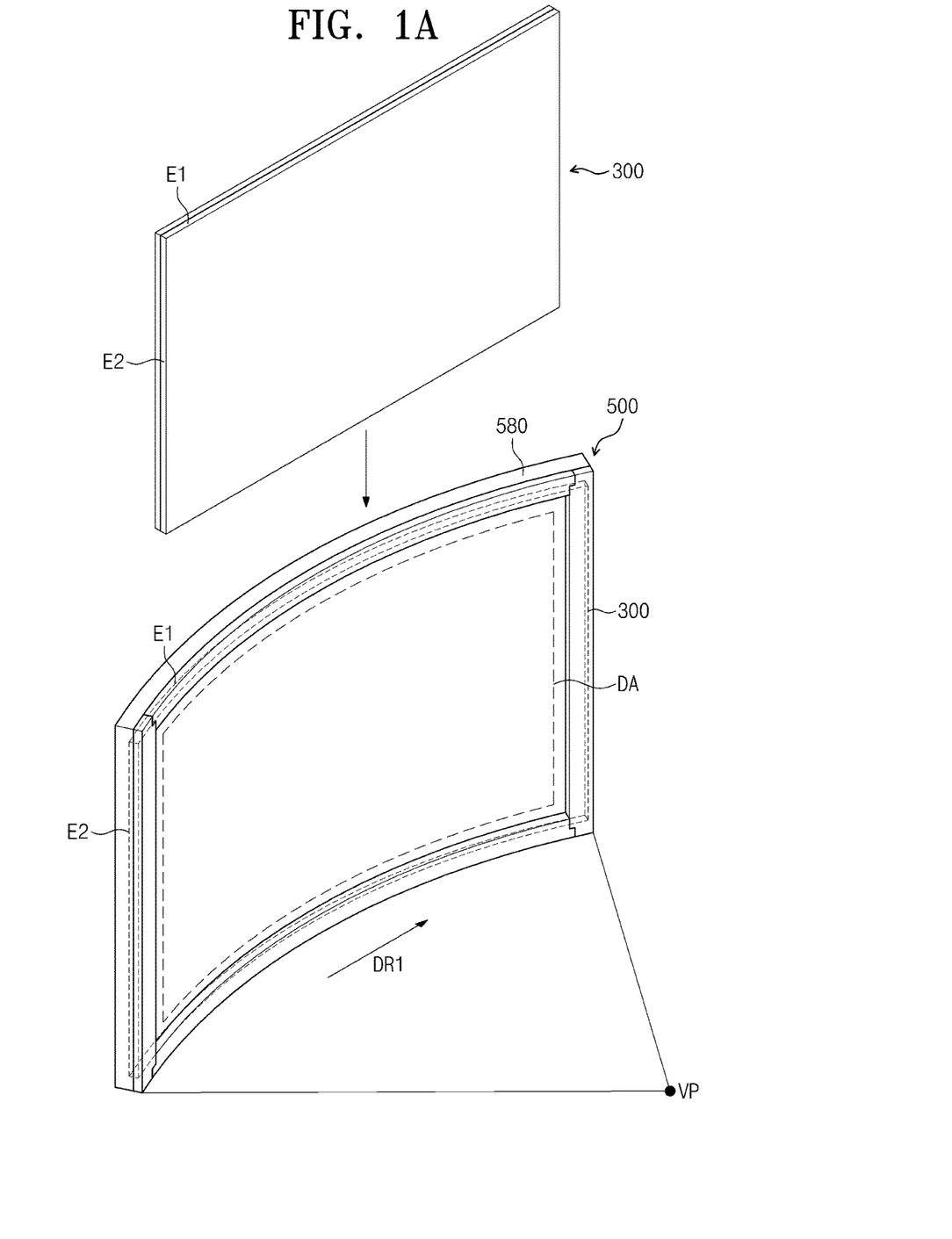
FIG. 1A is a perspective view of a curved display device according to an embodiment of the inventive concept.
Figure 1B:
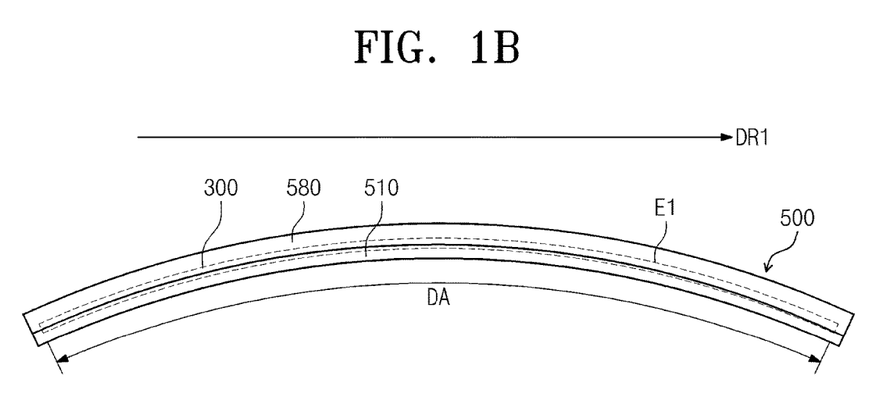
FIG. 1B is a plane view of the curved display device shown in FIG. 1A.

FIG. 1A is a perspective view of a curved display device according to an embodiment of the inventive concept, and FIG. 1B is a plane view of the curved display device shown in FIG. 1A.

Referring to FIGS. 1A and 1B, a curved display device 500 has a shape curved along a first direction DR1 so that the curved display device 500 provides a display area DA having a curved shape. The curved display device 500 may include a display panel curved along the first direction DR1 and having the display area DA.

In this embodiment, a viewer's viewing point VP may be defined in front of the curved display device 500 and thus the display area DA may have a concave curved shape in front of the curved display device 500.

A long side E1 and a short side E2 are defined in the display panel 300, and in this embodiment, the long side E1 may have a shape curved along the first direction DR1 and the short side E2 may have a straight line shape.

In this embodiment, the display panel 300 may be a liquid crystal display panel, and in that case, the curved display device 500 may further include a backlight assembly (not shown) emitting light toward the display panel 300.

The curved display device 500 may further include members coupled to the display panel 300, and the members are coupled to the display panel 300 to allow the display panel 300 to be curved in the first direction DR1 and to maintain the curved shape thereof. In this embodiment, the members may include a receiving member 580 receiving the display panel 300, and a cover member 510 covering the display panel 300.

As shown in FIG. 1A, in the case the display panel 300 is not coupled to the cover member 510 and the receiving member 580, the display panel 300 may have a flat shape. Also, in the case the display panel 300 is coupled to the cover member 510 and the receiving member 580, the display panel 300 may have a curved shape.

Therefore, each of the receiving member 580 and the cover member 510 may have a curved shape so as to correspond to the curved shape of the display panel 300 in the curved display device 500. For example, a bottom of the receiving member 580 facing a rear surface of the display panel 300 may have a shape curved in the first direction DR1, and a portion of the cover member 510 covering the long side E1 of the display panel 300 may have a shape curved along the first direction DR1.

Figure 2:
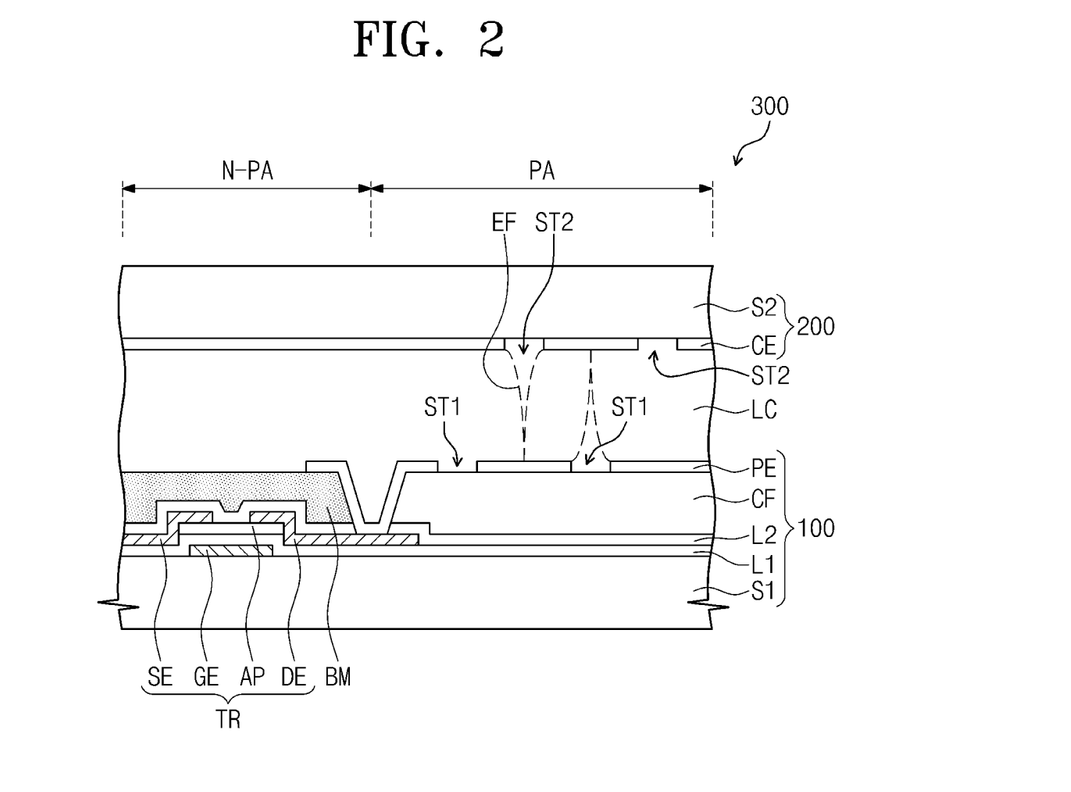
FIG. 2 is a cross-sectional view of a pixel included in the display panel shown in FIG. 1A.

FIG. 2 is a cross-sectional view of a pixel included in the display panel 300 shown in FIG. 1A. While the display panel 300 includes a plurality of pixels, FIG. 2 shows an exemplar structure of one of the plurality of pixels and description of the remaining pixels will be omitted. Also, a section of the display panel 300 in a state which is not flat but is curved is shown in FIG. 2.

Referring to FIG. 2, the display panel 300 includes a display substrate 100, a counter substrate 200, and a liquid crystal (LC) layer interposed between the display substrate 100 and the counter substrate 200.

The display substrate 100 includes a first substrate S1, and a thin film transistor TR, a color filter CF, a light shielding layer BM, and a pixel electrode PE which are disposed on the first substrate S1. In this embodiment, the first substrate S1 may be a glass substrate having light transmittance characteristic, and in another embodiment, the first substrate S1 may be a plastic substrate having a light transmittance characteristic.

The thin film transistor TR may be disposed on a non-pixel area N-PA and may include a gate electrode GE, an active pattern AP, a source electrode SE, and a drain electrode DE. The gate electrode GE is branched from a gate line (not shown), and the active pattern AP may be disposed on the gate electrode GE with a first insulating layer L1 in-between. The source electrode SE is branched from a data line (not shown) and disposed on the active pattern AP, and the drain electrode DE is spaced apart from the source electrode SE and disposed on the active pattern AP.

In this embodiment, the active pattern AP may contain silicon. However, the inventive concept does not limit the types of materials contained in the active pattern AP, and in another embodiment, the active pattern AP may contain an oxide semiconductor, such as IGZO, ZnO, $SnO_2$, $In_2O_3$, $Zn_2SnO_4$, $Ge_2O_3$, or $HfO_2$.

A second insulating layer L2 covers the thin film transistor TR, the color filter CF is disposed on the second insulating layer L2 in the pixel area PA, and the light shielding layer BM is disposed on the second insulating layer L2 in a non-pixel area N-PA. The color filter CF filters light incident into the display substrate 100 through the first substrate S1 into a colored light, and the light shielding layer BM shields the incident light.

While this embodiment shows and describes that the color filter CF and the light shielding layer BM are disposed on the first substrate S1, the inventive concept is not limited thereto. In another embodiment, the color filter CF and the light shielding layer BM may be disposed on the second substrate S2.

The pixel electrode PE is disposed on the pixel area PA and is electrically connected to the thin film transistor TR. The pixel electrode PE may include a conductive material having light transmittance, such as indium tin oxide (ITO) or indium zinc oxide (IZO).

In this embodiment, a plurality of first slits ST1 are formed in the pixel electrode PE, and each of the plurality of first slits ST1 may be formed by partially removing the pixel electrode PE. Thus, the pixel electrode PE may form an electric filed EF together with the common electrode CE in which a plurality of second slits ST2 are formed, and the orientation direction of liquid crystal molecules in the liquid crystal layer LC may be controlled by the electric field.

The counter substrate 200 includes a second substrate S2 and a common electrode CE disposed on the second substrate S2. The second substrate S2 may be a glass substrate or a plastic substrate having light transmittance.

The common electrode CE is disposed on the second substrate S2 and faces the pixel electrode PE with the liquid crystal layer LC in-between. In this embodiment, a plurality of second slits ST2 are formed in the common electrode CE. Each of the plurality of second slits ST2 may be formed by partially removing the common electrode CE.

As the display substrate 100 is viewed from a point over the counter substrate 200, the plurality of second slits ST2 and the plurality of first slits ST1 are alternately repeatedly arranged. That is, when the display panel 300 is curved, the plurality of second slits ST2 do not overlap the plurality of first slits ST1. Therefore, the electric field EF having a force component in a direction horizontal to the first and second substrates S1 and S2 (e.g. a fringe field) may be generated, so that the display panel 300 may operate in a patterned vertical alignment (PVA) mode in which the orientation direction of liquid crystal molecules in the liquid crystal layer LC are controlled by using the electric field.

Figure 3A:
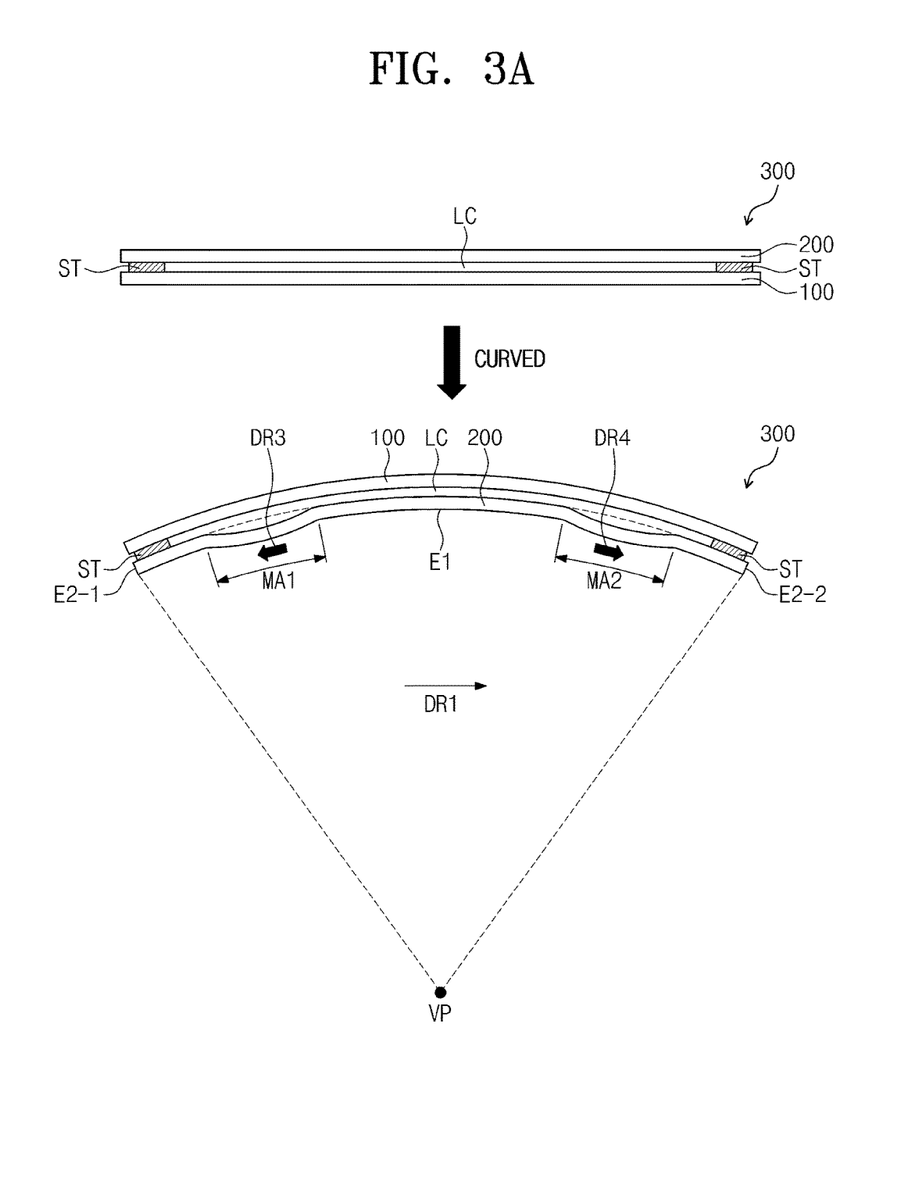
FIG. 3A is a plane view showing a curved process of the display panel shown in FIG. 1A.
Figure 3B:
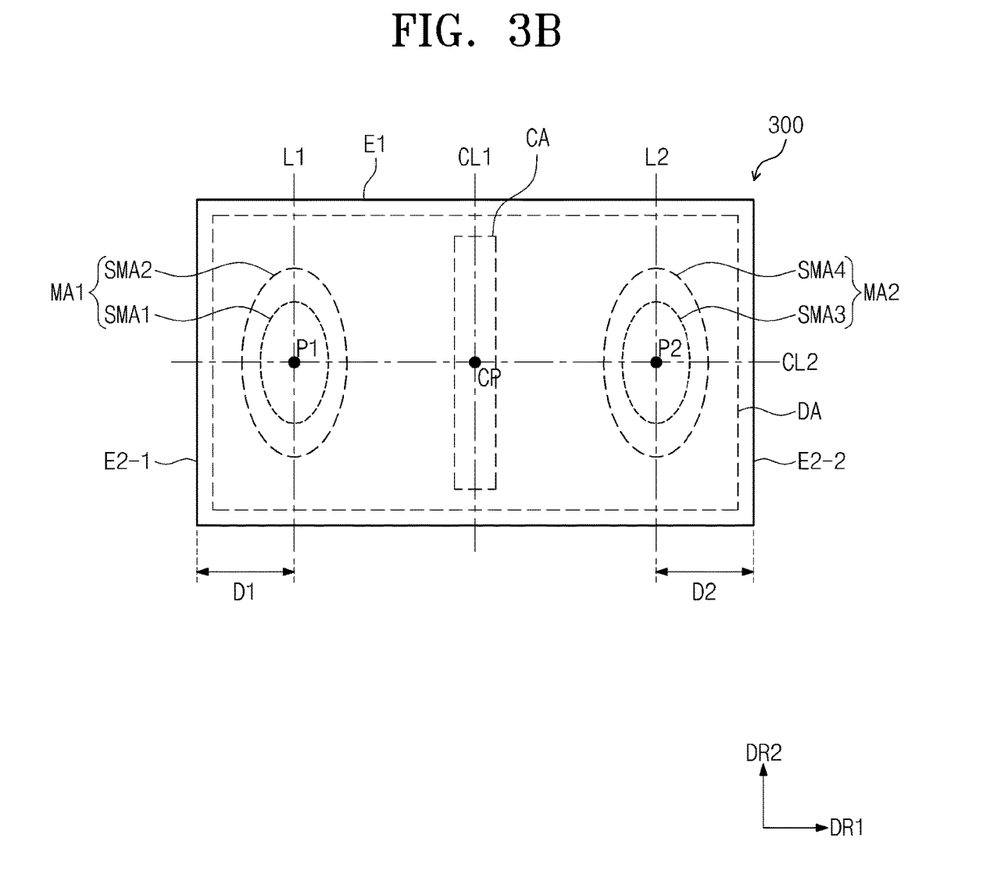
FIG. 3B is a front view of the curved display panel shown in FIG. 3A.

FIG. 3A is a plane view showing a curved process of the display panel 300 shown in FIG. 1A and FIG. 3B is a front view of the curved display panel 300 shown in FIG. 3A. A flat state and a curved state of the display panel 300 are shown in FIG. 3A.

Referring to FIGS. 3A and 3B, the display panel 300 includes a display substrate 100, a counter substrate 200, a liquid crystal layer LC, and a sealant ST. The sealant ST may be provided along an edge of the display substrate 100 or an edge of the counter substrate 200, and the display substrate 100 may be coupled to the counter substrate 200 with the liquid crystal layer LC in-between by the sealant ST.

As shown in FIG. 3A, when the display panel 300 is converted from a flat state to a curved state, a lift-off phenomenon may occur in the counter substrate 200 which is curved with a curvature radius less than the display substrate 100.

When the lift-off phenomenon occurs, the display substrate 100 and the counter substrate 200 may not align to each other correctly. When the display panel 300 is flat, there is no misalignment, but when the display panel 300 is curved, the misalignment happens. Thus, the misalignment may happen while the display panel 300 with a flat shape is curved by a supporting force of the receiving member (e.g. 580 of FIG. 1A) and the cover member (e.g. 510 of FIG. 1A) coupled to the display panel 300.

Hereinafter, in order to describe the misalignment in more detail, a shift direction and a misalignment length are defined as follows. The direction to which the misalignment shifted the counter substrate 200 with respect to the display substrate 100 is defined as the shift direction. The distance how long the misalignment shifted the counter substrate 200 is shifted to the shift direction with respect to the display substrate 100 is defined as the misalignment length.

In this embodiment, the misalignment length may be approximately defined by the following equation:

$$D \geq (L \times T)/R \times 0.1 \qquad \text{Equation 1}$$

where D is the misalignment length, L is the length of the long side E1, T is the thickness of the first substrate S1 or the second substrate S2, and R is a curvature radius of the display panel 300.

For example, when the display panel 300 has a length of 55 inches and a curvature radius of 4,000 mm and each of the first and second substrates S1 and S2 has a thickness of 0.7 mm, a minimum value of the misalignment length may be 25 micrometers.

In the display panel 300, a first side area MA1, a central area CA and a second side area MA2 may be sequentially defined along the first direction DR1, and the first side area MA1 may be a left area of the display area DA and the second side area MA2 may be a right area of the display area DA. Also, the central area CA may overlap a center point CP of the display area DA to be positioned between the first side area MA1 and the second side area MA2.

In this embodiment, the misalignment may occur in each of the first side area MA1 and the second side area MA2, and may not occur in the central area CA. In this case, the shift direction in the first side area MA1 may be defined as a third direction DR3, and the third direction DR3 may be directed toward the first short side E2-1 in a direction approximately perpendicular to a normal direction of the counter substrate 200. Also, the shift direction in the second side area MA2 may be defined as a fourth direction DR4, and the fourth direction DR4 may be directed toward the second short side E2-2 in a direction approximately perpendicular to a normal direction of the counter substrate 200.

In this embodiment, referring to FIG. 3B, the positions of the first side area MA1 and the second side area MA2 may be defined as follows. When a first center line CL1 passing through the center point CP and perpendicular to the first direction DR1 is defined, the first side area MA1 is positioned between the first short side E2-1 and the first center line CL1, and the second side area MA2 is positioned between the second short side E2-2 and the first center line CL1.

Also, when a first line L1 extending in the second direction DR2 and spaced apart by a first distance D1 from the first short side E2-1 is defined and a second line L2 extending in the second direction DR2 and spaced apart by a second distance D2 from the second short side E2-2 is defined, the first line L1 divides the first side area MA1 into two portions and the second line L2 divides the second side area MA2 into two portions. In this embodiment, each of the first and second distances D1 and D2 may be about 10% to about 25% of the length of the long side E1.

Also, a second center line CL2 passing through the center point CP in the first direction DR1 is defined. A first point P1 is a cross point between the second center line CL2 and the first line L1, and a second point P2 is a cross point between the second center line CL2 and the second line L2. The first side area MA1 includes a first sub-area SMA1 and a second sub-area SMA2 surrounding the first sub-area SMA1, and the first point P1 is positioned at a center of the first sub-area SMA1. Also, the second side area MA2 includes a third sub-area SMA3 and a fourth sub-area SMA4 surrounding the third sub-area SMA3, and the second point P2 is positioned at a center of the third sub-area SMA3.

In this embodiment, the misalignment length defined in each of the first and third sub-areas SMA1 and SMA3 may be longer than the misalignment length defined in each of the second and fourth sub-areas SMA2 and SMA4.

Hereinafter, methods for designing electrodes of the display panel while compensating for the misalignment will be described.

Figure 4A:
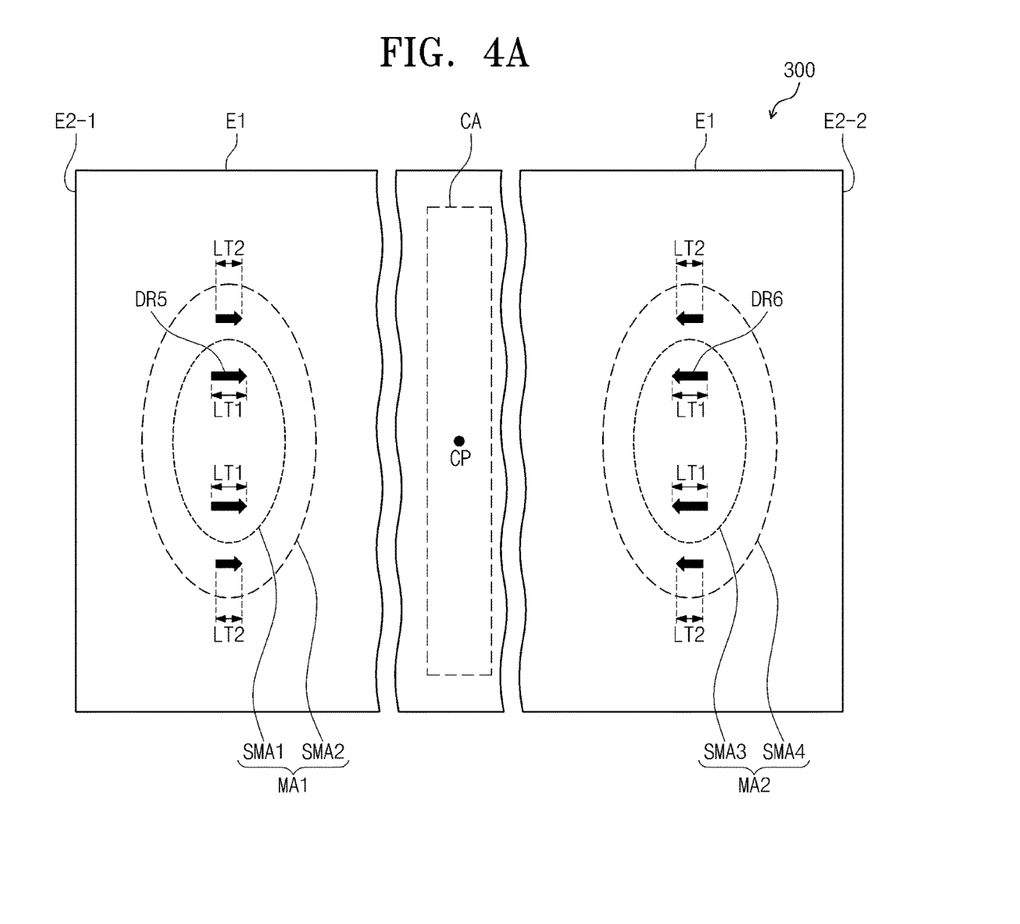
FIG. 4A is a schematic view showing a compensation design of a display panel corresponding to misalignment.
Figure 4B:
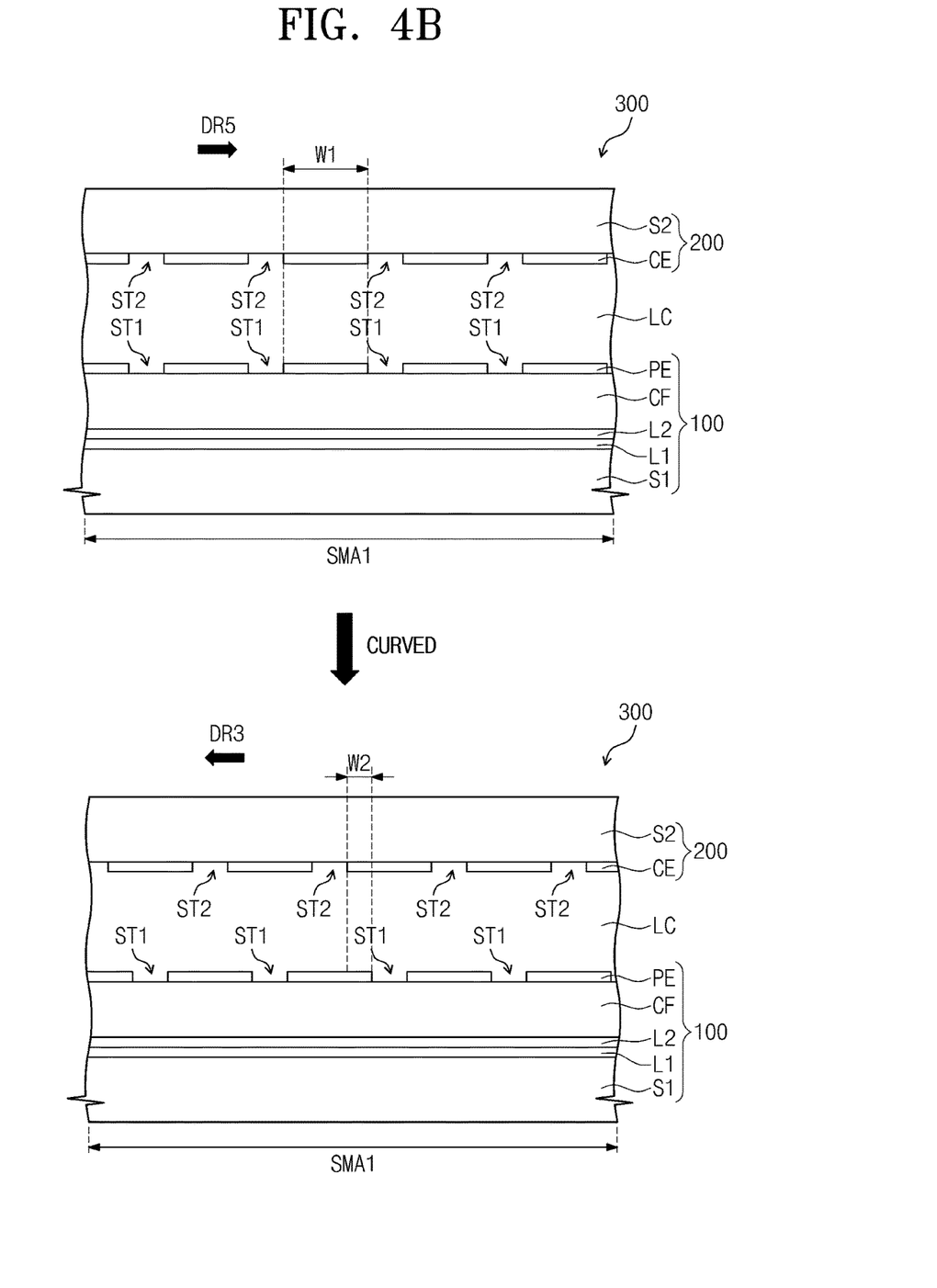
FIG. 4B is a cross-sectional view showing a section of a display panel corresponding to a first sub-area of a first side area to which compensation design is applied.

FIG. 4A is a schematic view showing a compensation design of a display panel 300 corresponding to misalignment and FIG. 4B is a cross-sectional view showing a section of a display panel 300 corresponding to a first sub-area SMA1 of a first side area MA1 to which compensation design is applied.

Referring to FIGS. 3A, 4A and 4B, the compensation design in this embodiment may be applied to the common electrode CE of the counter substrate 200. The compensation design will now be described.

Since the shift direction in the first sub-area SMA1 of the first side area MA1 is the third direction DR3, the second slits ST2 positioned in the first sub area SMA1 may be shifted in a fifth direction DR5 that is a reverse direction to the third direction DR3.

The structure of the second slits ST2 shifted in the fifth direction DR5 may be construed as follows. An overlapping width means how wide a portion of the common electrode CE positioned between two adjacent second slits among the plurality of second slits ST2 overlaps the pixel electrode PE. Referring to FIG. 4B, when the display panel 300 is in a state of flat, the common electrode CE may overlap the pixel electrode PE by a first overlapping width W1.

Also, when the display panel 300 is curved, since misalignment in which the counter substrate 200 is shifted in the third direction DR3 is generated, the common electrode CE after the display panel 300 is curved may overlap the pixel electrode PE by a second overlapping width W2 different from the first overlapping width W1. In this embodiment, the first overlapping width W1 may be greater than the second overlapping width W2.

Therefore, the second slits ST2 and the first slits ST1 may overlap each other before the display panel 300 is curved. However, after the display panel 300 is curved, the second slits ST2 and the first slits ST1 are alternately arranged so as not to overlap each other. As a result, the display panel 300 may operate in a PVA mode using the electric field (EF of FIG. 2) having a force component in a horizontal direction as described with reference to FIG. 2.

Figure 5:
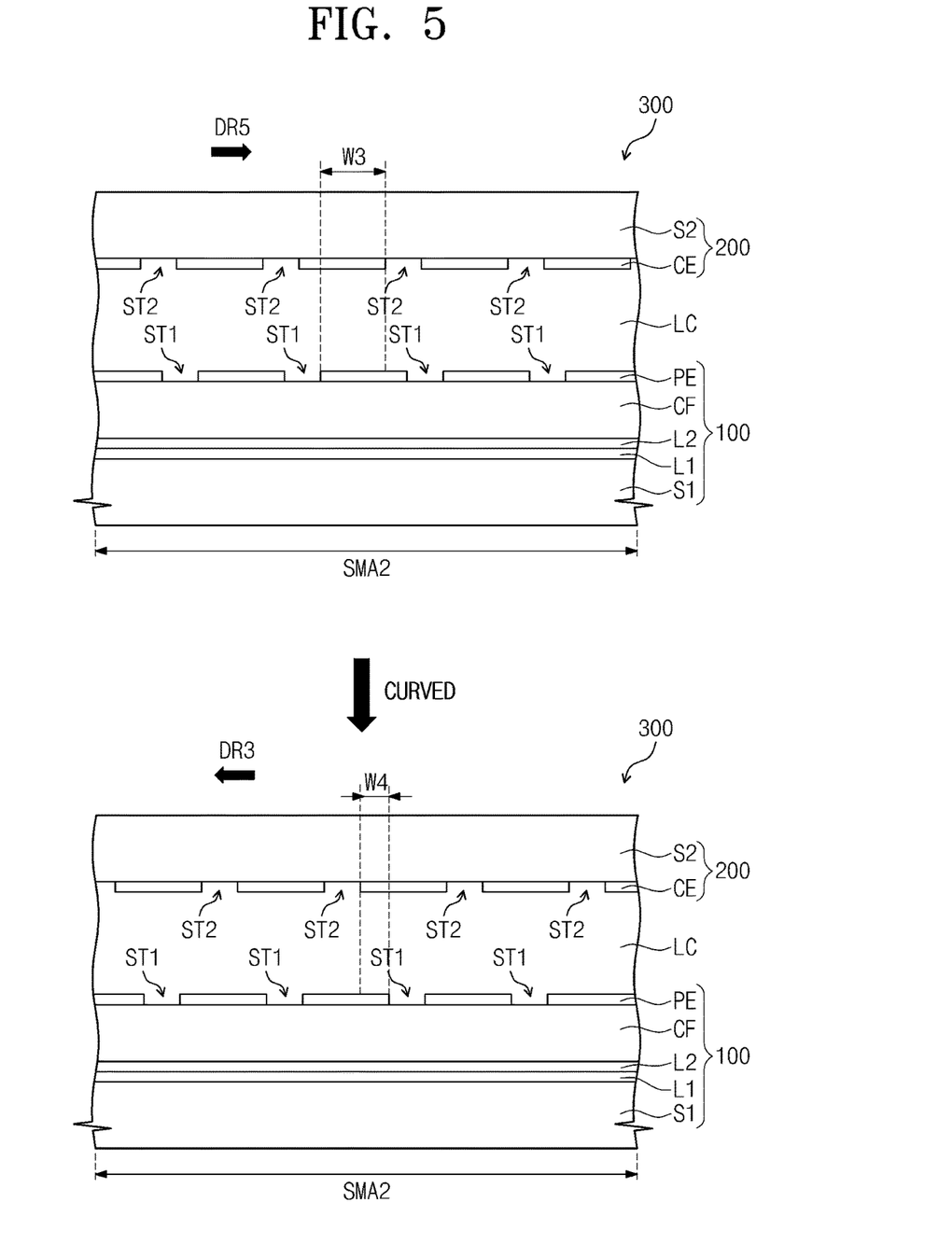
FIG. 5 is a cross-sectional view showing a section of a display panel corresponding to a second sub-area of a first side area to which compensation design is applied.

FIG. 5 is a cross-sectional view showing a section of a display panel 300 corresponding to a second sub-area SMA2 of a first side area MA1 to which compensation design is applied.

Referring to FIGS. 3A, 4A and 5, since the shift direction in the second sub-area SMA2 of the first side area MA1 is the third direction DR3, the second slits ST2 positioned in the second sub area SMA2 are shifted in the fifth direction DR5 that is a reverse direction to the third direction DR3.

The structure of the second slits ST2 shifted in the fifth direction DR5 may be construed as follows. Before the display panel 300 is curved, that is while the display panel 300 is in a state of flat, the common electrode CE may overlap the pixel electrode PE by a third overlapping width W3. Also, when the display panel 300 is curved, since misalignment in which the counter substrate 200 is shifted in the third direction DR3 is generated, the common electrode CE after the display panel 300 is curved may overlap the pixel electrode PE by a fourth overlapping width W4 different from the third overlapping width W3. In this embodiment, the third overlapping width W3 may be greater than the fourth overlapping width W4.

Therefore, at least a portion of the second slits ST2 and a portion of the first slits ST1 may overlap each other before the display panel 300 is curved. After the display panel 300 is curved, however, since the second slits ST2 and the first slits ST1 are alternately arranged so as not to overlap each other, the display panel 300 may operation in the PVA mode using the electric field (EF of FIG. 2) having a force component in a horizontal direction as described with reference to FIG. 2.

In this embodiment, the fourth overlapping width W4 may be equal to the second overlapping width (W2 of FIG. 4B). It may be construed that after the display panel 300 is curved, the second slits ST2 and the first slits ST1 are arranged so as not to overlap each other regardless of the arranged areas of the second slits ST2 and the first slits ST1 so that the display panel 300 operates in the PVA mode.

Also, the third overlapping width W3 may be less than the first overlapping width (W1 of FIG. 4B). It may be construed that the misalignment length in the first sub-area SMA1 is longer than that in the second sub-area SMA2. For example, when the misalignment length generated in the first sub-area SMA1 is about 25 micrometers, the misalignment length generated in the second sub-area SMA2 may be about 20 micrometers.

Figure 6:
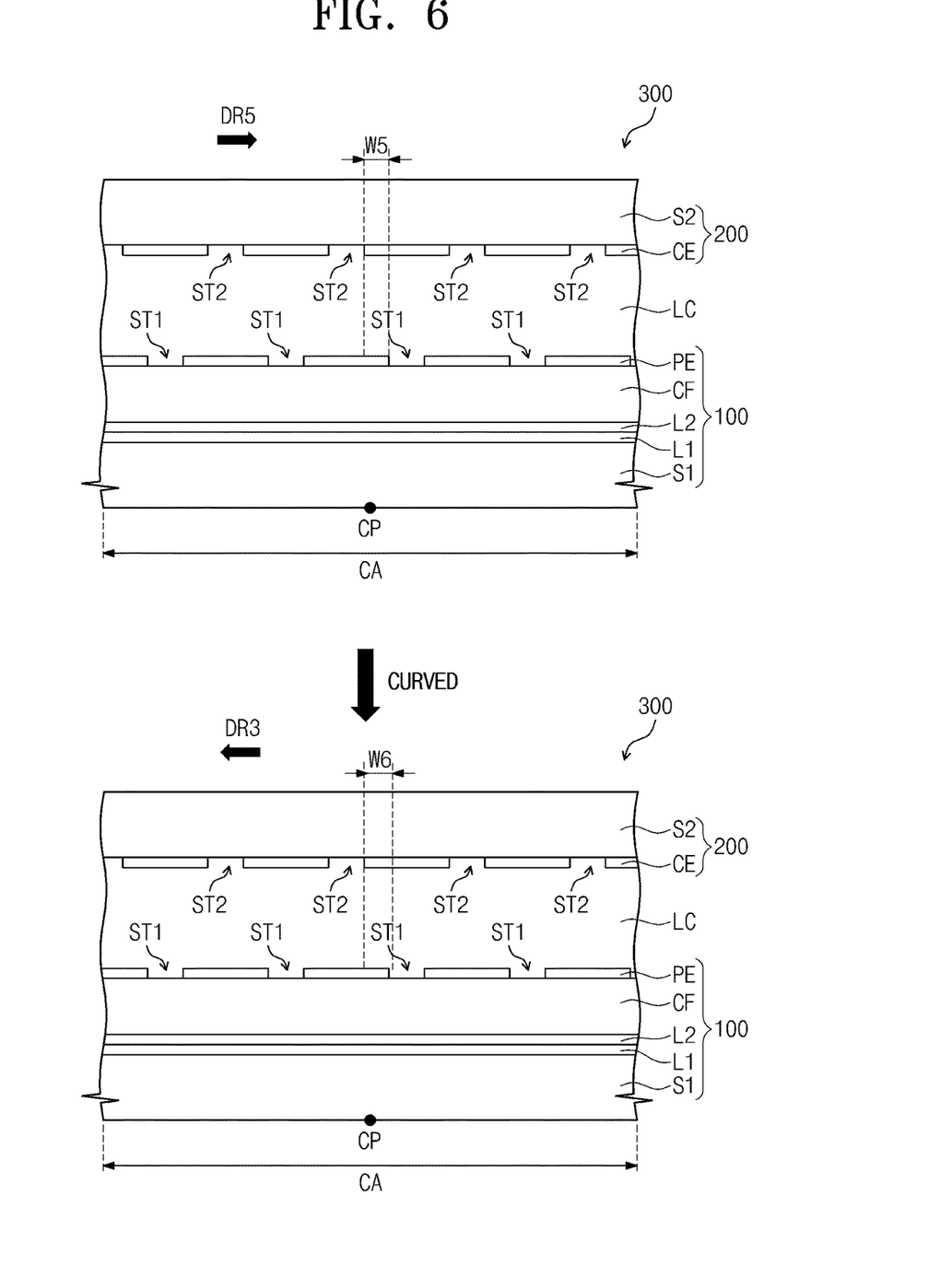
FIG. 6 is a cross-sectional view showing a sectional view of a display panel corresponding to a central area to which compensation design is applied.

FIG. 6 is a cross-sectional view showing a section of a display panel 300 corresponding to a central area CA to which compensation design is applied.

Referring to FIG. 6, although the display panel 300 is curved, misalignment is not generated in the central area CA of the display panel 300. Therefore, when it is assumed that before the display panel 300 is curved, the common electrode CE overlaps the pixel electrode PE by a fifth overlapping width W5, and after the display panel 300 is curved, the common electrode CE overlaps the pixel electrode PE by a sixth overlapping width W6, the length of the fifth overlapping width W5 may be equal to that of the sixth overlapping width W6.

Figure 7:
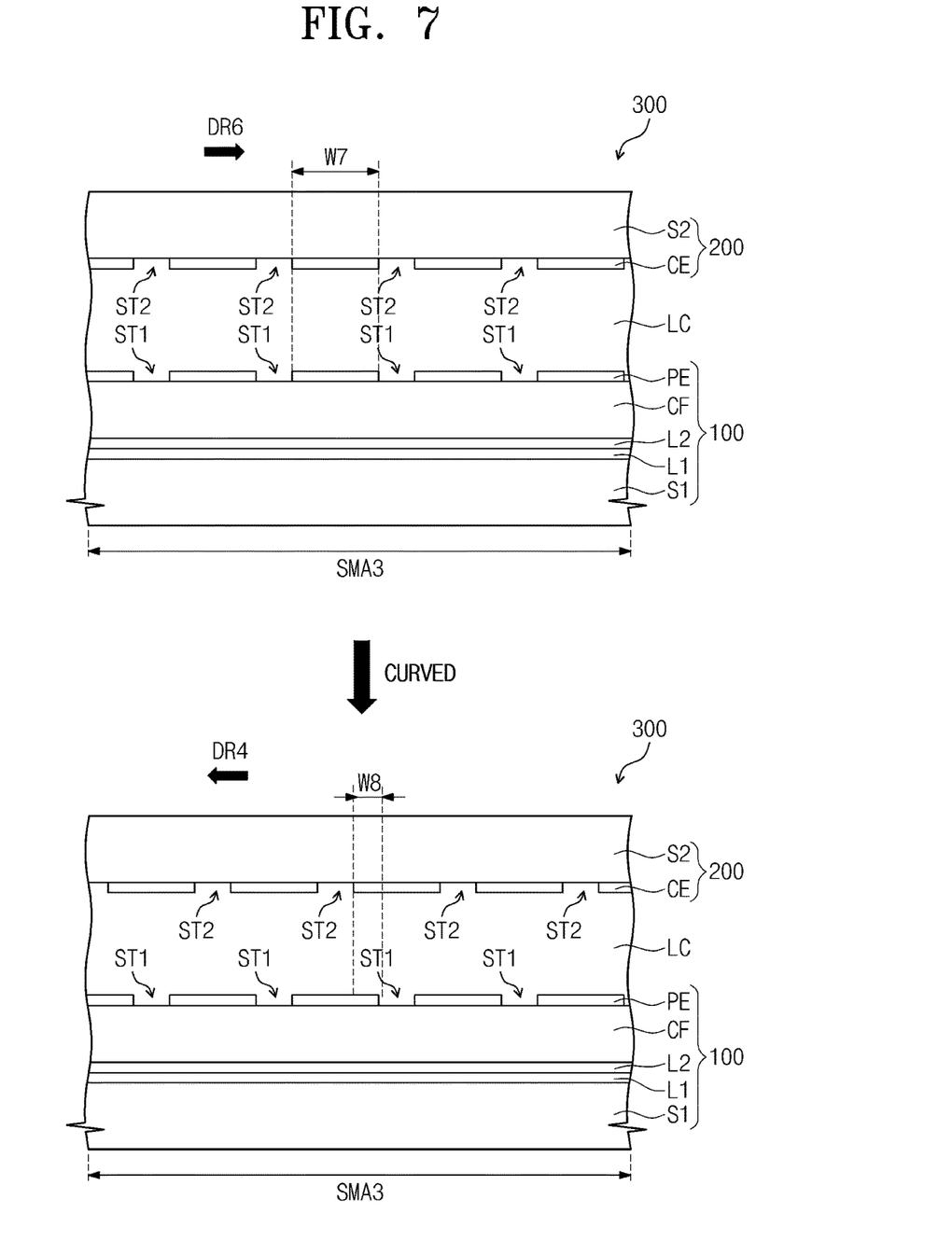
FIG. 7 is a cross-sectional view showing a section of a display panel corresponding to a third sub-area of a second side area to which compensation design is applied.

FIG. 7 is a cross-sectional view showing a section of a display panel 300 corresponding to a third sub-area SMA3 of a second side area MA2 to which compensation design is applied.

Referring to FIGS. 3A, 4A and 7, since the shift direction in the third sub-area SMA3 of the second side area MA2 is the fourth direction DR4, the second slits ST2 positioned in the third sub area SMA3 are shifted in the sixth direction DR6 that is a reverse direction to the fourth direction DR4.

The structure of the second slits ST2 shifted in the sixth direction DR6 may be construed as follows. Before the display panel 300 is curved, that is while the display panel 300 is in a state of flat, the common electrode CE may overlap the pixel electrode PE by a seventh overlapping width W7. Also, when the display panel 300 is curved, since misalignment shifts the counter substrate 200 in the fourth direction DR4, the common electrode CE after the display panel 300 is curved may overlap the pixel electrode PE by an eighth overlapping width W8 different from the seventh overlapping width W7. In this embodiment, the seventh overlapping width W7 may be greater than the eighth overlapping width W8.

Therefore, the second slits ST2 and the first slits ST1 may overlap each other before the display panel 300 is curved, but after the display panel 300 is curved, the second slits ST2 and the first slits ST1 are alternately arranged so as not to overlap each other. As a result, the display panel 300 may operate in a PVA mode using the electric field (EF of FIG. 2) having a force component in a horizontal direction as described with reference to FIG. 2.

Figure 8:
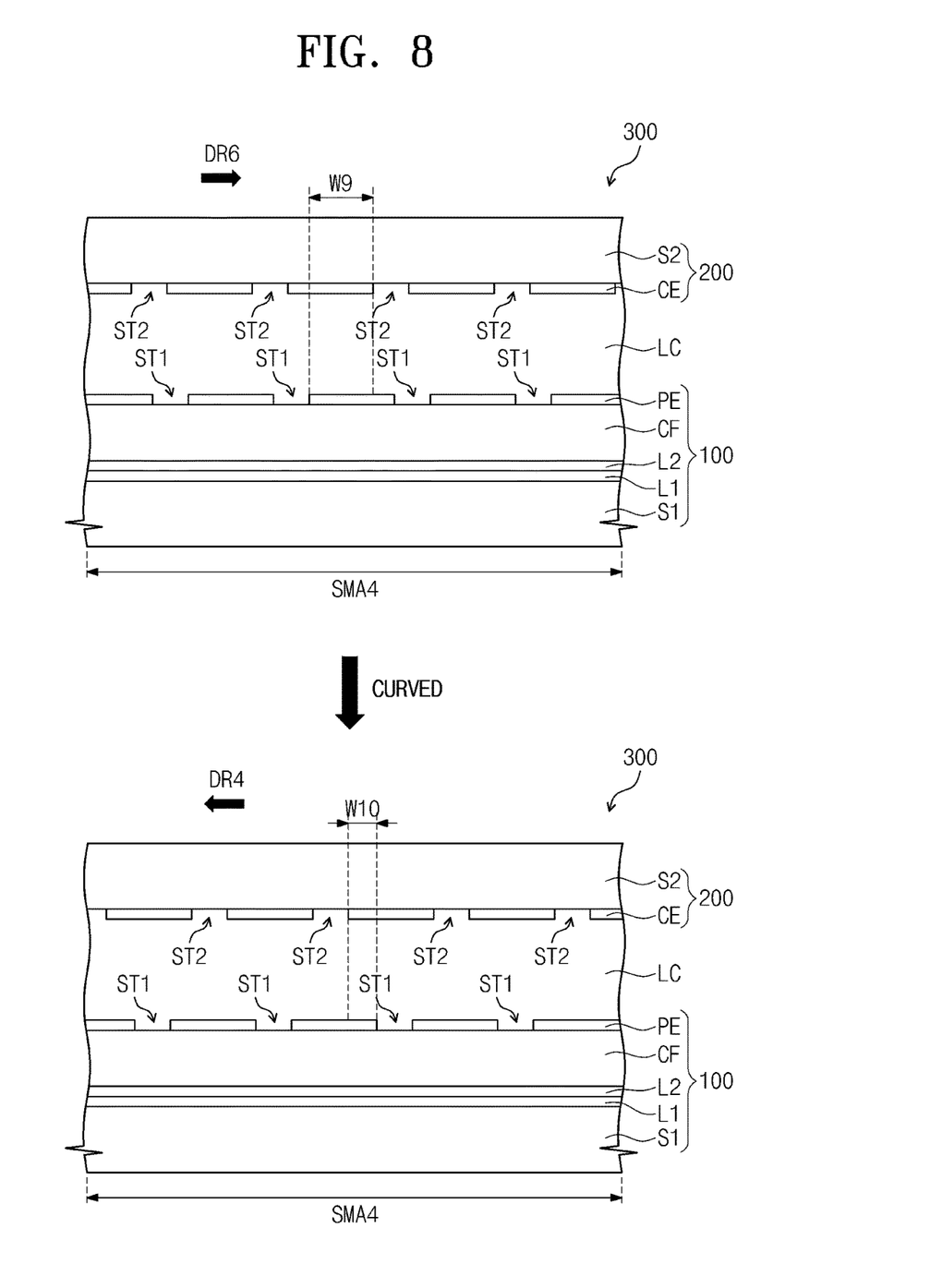
FIG. 8 is a cross-sectional view showing a section of a display panel corresponding to a fourth sub-area of a second side area to which compensation design is applied.

FIG. 8 is a cross-sectional view showing a section of a display panel 300 corresponding to a fourth sub-area SMA4 of a second side area MA2 to which compensation design is applied.

Referring to FIGS. 3A, 4A and 8, since the shift direction in the fourth sub-area SMA4 of the second side area MA2 is the fourth direction DR4, the second slits ST2 positioned in the fourth sub area SMA4 are shifted in the sixth direction DR6 that is a reverse direction to the fourth direction DR4.

The structure of the second slits ST2 shifted in the sixth direction DR6 may be construed as follows. Before the display panel 300 is curved, that is while the display panel 300 is in a state of flat, the common electrode CE may overlap the pixel electrode PE by a ninth overlapping width W9. Also, when the display panel 300 is curved, since misalignment shifts the counter substrate 200 in the fourth direction DR4, the common electrode CE after the display panel 300 is curved may overlap the pixel electrode PE by a tenth overlapping width W10 different from the ninth overlapping width W9. In this embodiment, the ninth overlapping width W9 may be greater than the tenth overlapping width W10.

Therefore, at least a portion of the second slits ST2 and a portion of the first slits ST1 may overlap each other before the display panel 300 is curved, but after the display panel 300 is curved, the second slits ST2 and the first slits ST1 are alternately arranged so as not to overlap each other. As a result, the display panel 300 may operate in a PVA mode using the electric field (EF of FIG. 2) having a force component in a horizontal direction.

Again referring to FIGS. 4B, 5, 6, 7 and 8, when the display panel has a curved shape, the second overlapping width W2 in the first sub-area SMA1, the fourth overlapping width W4 in the second sub-area SMA2, the sixth overlapping width W6 in the central area CA, the eighth overlapping width W8 in the third sub-area SMA3, and the tenth overlapping width W10 in the fourth sub-area SMA4 may be equal to one another. It may be construed that when the display panel 300 has a curved shape, the second slits ST2 and the first slits ST1 are arranged so as not to overlap each other regardless of the arranged areas of the second slits ST2 and the first slits ST1 so that the display panel 300 operates in the PVA mode.

According to the present invention, although a flat display panel is curved and thus misalignment is generated between two substrates, a compensation design applied to the display panel prevents the display quality deterioration caused by the misalignment.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A curved display device, comprising:
a display panel having a display area and including a display substrate and a counter substrate coupled to the display substrate; and
a member coupled to the display panel to curve the display panel in a first direction,
wherein the display substrate comprises:
a pixel electrode disposed in the display area and having a plurality of first slits,
wherein the counter substrate comprises:
a common electrode facing the pixel electrode and having a plurality of second slits,
wherein a first side area, a central area and a second side area are sequentially located in the first direction on the display area,
wherein the first side area, the central area and the second side area are each independently comprise a plurality of pixels,
wherein, when the display panel has a flat shape, a portion of the common electrode positioned between two adjacent second slits among the plurality of second slits overlaps the pixel electrode by an overlapping width, and wherein the overlapping width in each of the plurality of the pixels of the first side area and the plurality of the pixels of the second side area is different in length from the overlapping width in the plurality of the pixels of the central area.

2. The curved display device of claim 1, wherein the overlapping width includes:
a central overlapping width in the central area;
a first side overlapping width in the first side area; and
a second side overlapping width in the second side area, and
wherein, when the display panel has a curved shape, the central overlapping width, the first side overlapping width, and the second side overlapping width are equal.

3. The curved display device of claim 1, wherein the overlapping width in each of the first and second side areas is greater in length than the overlapping width in the central area.

4. The curved display device of claim 2, wherein the central overlapping width when the display panel is curved is equal to the central overlapping width when the display panel is flat.

5. The curved display device of claim 2, wherein when the display panel is curved, the plurality of second slits and the plurality of first slits are alternately repeatedly arranged on a plane.

6. The curved display device of claim 5, wherein when the display panel is curved, the plurality of second slits do not overlap the plurality of first slits.

7. The curved display device of claim 1, wherein when the display panel is flat, a portion of the plurality of second slits overlaps a portion of the plurality of first slits.

8. The curved display device of claim 1, wherein the display area has a concave shape curved in the first direction.

9. The curved display device of claim 8, wherein the counter substrate has a curvature radius less than the display substrate.

10. The curved display device of claim 8, wherein
the display panel has long sides in the first direction, and a first short side and a second short side in a second direction perpendicular to the first direction,
a first center line passing through a center of the display area is defined along the second direction,
the first side area is positioned between the first short side and the first center line, and
the second side area is positioned between the second short side and the first center line.

11. The curved display device of claim 10, wherein
a first line spaced apart by a first distance from the first short side is defined along the second direction in the display panel,
a second line spaced apart by a second distance from the second short side is defined along the second direction in the display panel,
the first line divides the first side area into two portions, and
the second line divides the second side area into two portions.

12. The curved display device of claim 11, wherein each of the first distance and the second distance is about 10% to about 25% in length of one of the long side.

13. The curved display device of claim 1, wherein
the first side area comprises a first sub-area and a second sub-area surrounding the first sub-area, and
the second side area comprises a third sub-area and a fourth area surrounding the third sub-area,
wherein
when the display panel is flat,
the overlapping width in the first sub-area is different in length from the overlapping width in the second sub-area, and
the overlapping width in the third sub-area is different in length from the overlapping width in the fourth sub-area.

14. A curved display device, comprising:
a curved display panel with a curved display area including a display substrate and a counter substrate coupled to the display substrate; and
a member coupled to the display panel to allow the display panel to be curved in a first direction and to maintain the curved shape thereof,
wherein the display substrate includes a pixel electrode disposed in the display area and in which a plurality of first slits are formed, and the counter substrate includes a common electrode facing the pixel electrode and in which a plurality of second slits are formed,
wherein the plurality of second slits and the plurality of first slits are alternately repeatedly arranged,
wherein a first side area, a central area, and a second side area are sequentially positioned in the first direction on the display area,
wherein a portion of the common electrode positioned between two adjacent second slits among the plurality of second slits overlaps the pixel electrode by an overlapping width, and
wherein the overlapping width in the first area, the overlapping width in the second area, and the overlapping width in the central area are equal to one another.

15. The curved display device of claim 14, wherein the plurality of second slits do not overlap the plurality of first slits.

16. A display panel for a curved display device, comprising:
a first substrate with a display area;
a first electrode with a plurality of first slits;
a second substrate;
a second electrode with a plurality of second slits,
wherein a first side area, a central area, and a second side area are sequentially positioned in the first direction on the display area,
wherein the first side area, the central area and the second side area are each independently comprise a plurality of pixels,
wherein a portion of the first electrode positioned between two adjacent second slits among the plurality of second slits overlaps the second electrode by an overlapping width, and
wherein the overlapping width in each of the plurality of the pixels of the first side area and the second area is different from the overlapping width in the plurality of the pixels of the central area.

17. The display panel for a curved display device of claim 16, wherein
the first electrode with a plurality of first slits is formed on the first substrate,
the second electrode with a plurality of second slits is formed on the second substrate, and
the first substrate and the second substrate are coupled together to have the first electrode and the second electrode face each other.

18. The display panel for a curved display device of claim 16, wherein
the first electrode with a plurality of first slits and the second electrode with a plurality of second slits are formed on a same substrate.

* * * * *